United States Patent [19]
Chang et al.

[11] Patent Number: 6,111,766
[45] Date of Patent: Aug. 29, 2000

[54] METHOD FOR COMPENSATING AN OUTPUT SIGNAL OF AN ELECTRONIC DEVICE

[75] Inventors: Gavin Chang, Taipei; Jing Chen, Fengshan; Ya-Hui Kuo, Taoyuan, all of Taiwan

[73] Assignee: Delta Electronics, Inc., Taoyuan Hsien, Taiwan

[21] Appl. No.: 09/350,731

[22] Filed: Jul. 9, 1999

[30] Foreign Application Priority Data

Dec. 28, 1998 [TW] Taiwan ................................. 87121752

[51] Int. Cl.⁷ ..................................................... H02M 3/24
[52] U.S. Cl. ............................................................. 363/79
[58] Field of Search ................................. 363/50, 35, 34, 363/39, 79

[56] References Cited

U.S. PATENT DOCUMENTS

| | | | |
|---|---|---|---|
| 4,192,974 | 3/1980 | Kiko | 379/414 |
| 4,716,274 | 12/1987 | Gilliland | 219/130.21 |
| 4,888,673 | 12/1989 | Droege | 363/21 |

Primary Examiner—Shawn Riley
Attorney, Agent, or Firm—William J. Sapone, Esq.; Nims, Howes, Collison, Hansen & Lackert

[57] ABSTRACT

A method is provided for compensating an output signal of an electronic device having an input end electrically connected to a feedback device and an output end electrically connected to a load. This method includes steps of (a) measuring a standard voltage $V_o$ of the load, (b) determining an input voltage $V_i$ and an input current $I_i$ of the electronic device, and (c) generating a feedback signal based on said input voltage $V_i$. The method further includes steps of (d) determining a maximum current $I_{max}$ and a minimum current $I_{min}$ of the feedback signal passing through the feedback device, (e) defining an estimated output current $I_o$ of the electronic device based on the maximum current $I_{max}$ and the minimum current $I_{min}$, and (f) compensating the output signal of the electronic device according to a compensating factor d determined by the standard voltage $V_o$, the input voltage $V_i$, the input current $I_i$, and the estimated output current $I_o$, of the electronic device. The estimated output current $I_o$ is calculated according to the maximum current $I_{max}$ and the minimum current $I_{min}$ by a first equation of $I_o = I_{max} + kI_{min}$ where k is a constant.

12 Claims, 11 Drawing Sheets

METHOD FOR COMPENSATING AN OUTPUT SIGNAL OF AN ELECTRONIC DEVICE

FIELD OF THE INVENTION

The present invention relates to a method for compensating a signal outputted from an electronic device, e.g. a converter.

BACKGROUND OF THE INVENTION

Please refer to FIG. 1 which is a circuit diagram of a frequency converter of the prior art. The frequency converter includes a power source 15, an alternating-current/direct-current (AC/DC) converter 11, a direct-current/alternating-current (DC/AC) converter 12, and a current sensor 14. The output signal of the frequency converter is an alternating-current signal and is outputted to a load 13. The DC/AC converter 12 includes a plurality of switching circuits which will generate many harmonic waves and in turn adversely affect the characteristics of the power signal, i.e. the power factor. The power factor is a ratio of the actual power to apparent power (simple product of voltage and current). The power factor p can be calculated from an equation of p=cos θ, where θ is the phase angle of the signal. In order to maintain the current's stability of the load 13, the harmonic waves should be eliminated and a method for compensating the signal according to the power factor is needed. Therefore, in order to estimate a compensating factor of the signal, the signal outputted from the DC/AC converter 12 is measured by the current sensor 14 and then transmitted to a circuit, e.g. a microprocessor, for processing and compensating the signal.

The current sensor 14 positioned at the alternating-current end of the DC/AC converter 12 must have an ability for loading large electric powers. However, the current sensor 14, e.g. current transformer (CT), is relatively expensive. In order to reduce the cost of the converter, the current sensor 14 is removed and the method for estimating the compensating factor should be changed.

Because the switching circuits inside the DC/AC converter 12 will affect the power signal, the output current transmitted to the load can be estimated by the input current of the DC/AC converter 12. Please refer to FIG. 2 which shows the circuit of another frequency converter of the prior art. A resistor 21 is placed at the direct-current end of the DC/AC converter 12 as shown in FIG. 2. The resistor 21 is used as a feedback device for compensating the output signal of the DC/AC converter. The signal is compensated according to the phase angle of the output signal, a compensating factor is then calculated. The compensating factor for compensating the output signal of the DC/AC converter is estimated according to the signal passing through the resistor 21. This compensating method is a dead-time compensation.

Please refer to FIG. 3 which shows the circuit used in the dead-time compensation of the prior art. The voltage difference of the resistor 21 is measured and then transformed to a current signal. The current signal is amplified by a preamplifier 31 and then divided into a positive peak signal and a negative peak signal. The positive peak current $I_{peak}(+)$ and negative peak current $I_{peak}(-)$ are respectively measured by the positive peak current detector 32 and the negative peak current detector 33. Both $I_{peak}(+)$ and $I_{peak}(-)$ are compared by a comparator 34. The relatively larger one of the $I_{peak}(+)$ and $I_{peak}(-)$ is defined as an estimated output current and then outputted to a microprocessor 35 for calculating the compensating factor of the dead-time compensation.

Please refer to FIG. 4 which is a flow chart showing the method for compensating the signal. First, the output voltage $V_o$ of the load is defined and the input voltage $V_i$ and input current $I_i$ of the DC/AC converter are also measured. Thereafter, the positive peak current $I_{peak}(+)$ and the negative peak current $I_{peak}(-)$ of the feedback device, i.e. the resistor, are measured. The relatively larger one of $I_{peak}(+)$ and $I_{peak}(-)$ is defined as an estimated output current $I_o$. The compensating factor d for compensating the output signal is calculated by an equation of $$d = \cos^{-1}\left(\frac{\sqrt{2}}{\sqrt{3}} \frac{V_i \cdot I_i}{V_o \cdot I_o}\right).$$

The output current of the DC/AC converter 12 is adjusted according to the compensating factor d.

However, the waveform of the signal outputted from the DC/AC converter 12 is varied along with different phase angles. Please refer to FIGS. 5(a)–5(c) which show different waveforms with different phase angles. FIGS. 5(a), 5(b), 5(c) are diagrams respectively show the waveform of the output signal having a phase angle of 30, 60, 90 degree. The waveform of the output signal is changed when the phase angle is greater than 30 degree because the estimated output current $I_o$, i.e. the relatively larger one of $I_{peak}(+)$ and $I_{peak}(-)$, is not the same as the actual output current. In fact, when the phase angle is greater than 60 degree, the estimated output current $I_o$ is smaller than the actual output current. Therefore, the compensating factor d calculated by the estimated output current $I_o$ is not correct, and this method for compensating the output signal is poor. Besides, the estimated output current $I_o$ is also smaller than the actual one when the phase angle is ranged from 30 to 60 degree. It is not easy to calculate an estimated output current which approaches to the actual current unless the current is measured by a detector with a high sensitivity. However, the detector with a high sensitivity is very expensive and the cost of the converter will be increased.

Referring to FIG. 6, the form of the output current with poor compensation is not smooth and will cause a damage of the load. The operation of the load is very unstable. Therefore, it is tried by the applicant to solve the above-described problem.

SUMMARY OF THE INVENTION

Therefore, an object of the present invention is to provide a method for estimating a compensating factor for compensating a signal.

Another object of the present invention is to provide a method for estimating a compensating factor used in a dead-time compensation.

According to the present invention, the method for compensating an output signal of an electronic device which has an input end electrically connected to a feedback device and an output end electrically connected to a load, includes the steps of (a) defining an output voltage $V_o$ of the load, (b) determining an input voltage $V_i$ and an input current $I_i$ of the electronic device, and (c) generating a feedback signal based on the input voltage $V_i$. The method further includes steps of (d) determining a maximum current $I_{max}$ and a minimum current Imin of the feedback signal passing through the feedback device, (e) defining an estimated output current $I_o$ of the electronic device based on the maximum current $I_{max}$ and the minimum current $I_{min}$, and (f) compensating the output signal of the electronic device according to a compensating factor d determined by the output voltage $V_o$, the input voltage $V_i$, the input current $I_i$, and the estimated output current $I_o$ of the electronic device.

Preferably, the electronic device is a DC/AC converter coupled to a AC/DC converter. Besides, the feedback device includes a resistor electrically connected between the AC/DC converter and the DC/AC converter for generating a voltage difference in order to estimate a current of the feedback signal.

In accordance with the present invention, the feedback signal is amplified by an amplifier of the feedback device and then divided into a positive peak signal and a negative peak signal. The currents of the positive peak signal and the positive peak signal are respectively detected by a positive peak current detector and a negative peak current detector. The maximum current $I_{max}$ is the relatively larger one detected by the positive peak current detector and the negative peak current detector. The minimum current $I_{min}$ is the relatively smaller one detected by the positive peak current detector and the negative peak current detector.

In accordance with the present invention, the estimated output current $I_o$ is calculated according to the maximum current $I_{max}$ and the minimum current $I_{min}$ by a first equation of $I_o = I_{max} + kI_{min}$ where k is a constant.

In accordance with the present invention, the compensating factor d is determined by a second equation $$d = \cos^{-1}\left(\frac{\sqrt{2}}{\sqrt{3}} \frac{V_i \cdot I_i}{V_o \cdot I_o}\right)$$

where $V_o$ is the standard voltage of the load, $V_i$ is the input voltage, $I_i$ is the input current, and $I_o$ is the estimated output current of the electronic device.

In accordance with the present invention, the method is applied in compensating a signal of a frequency converter. Besides, the method is a dead time compensation.

The present invention may best be understood through the following description with reference to the accompanying drawings, in which:

DETAILED DESCRIPTION OF THE PREFERRED EMBODIMENTS

Figure 1:
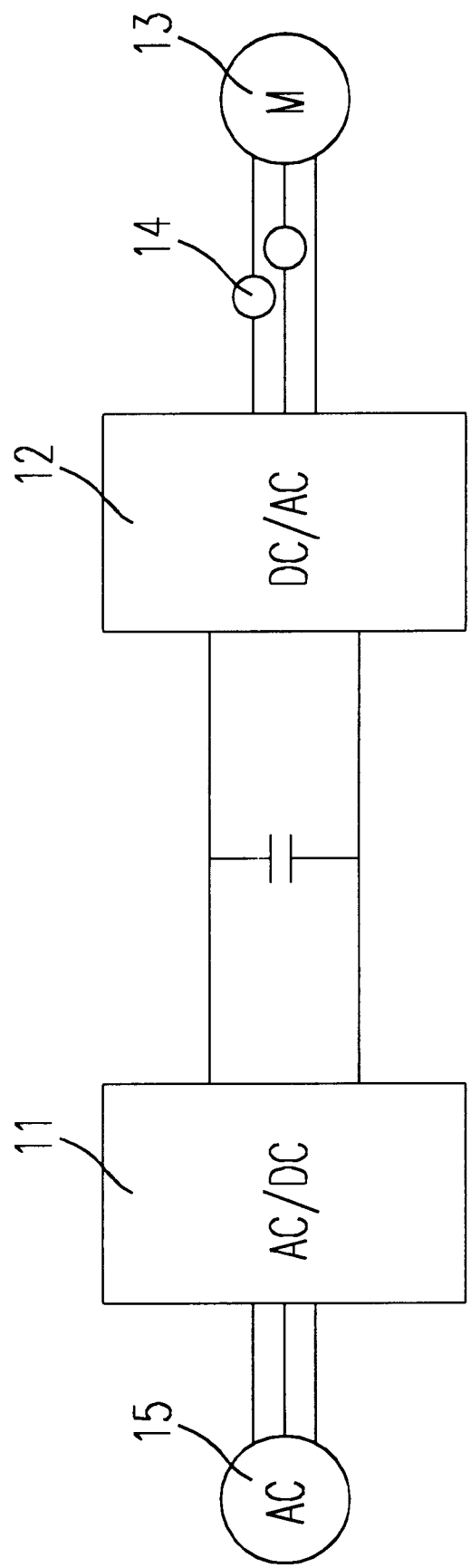
FIG. 1 is a diagram showing a conventional circuit of a frequency converter.
Figure 2:
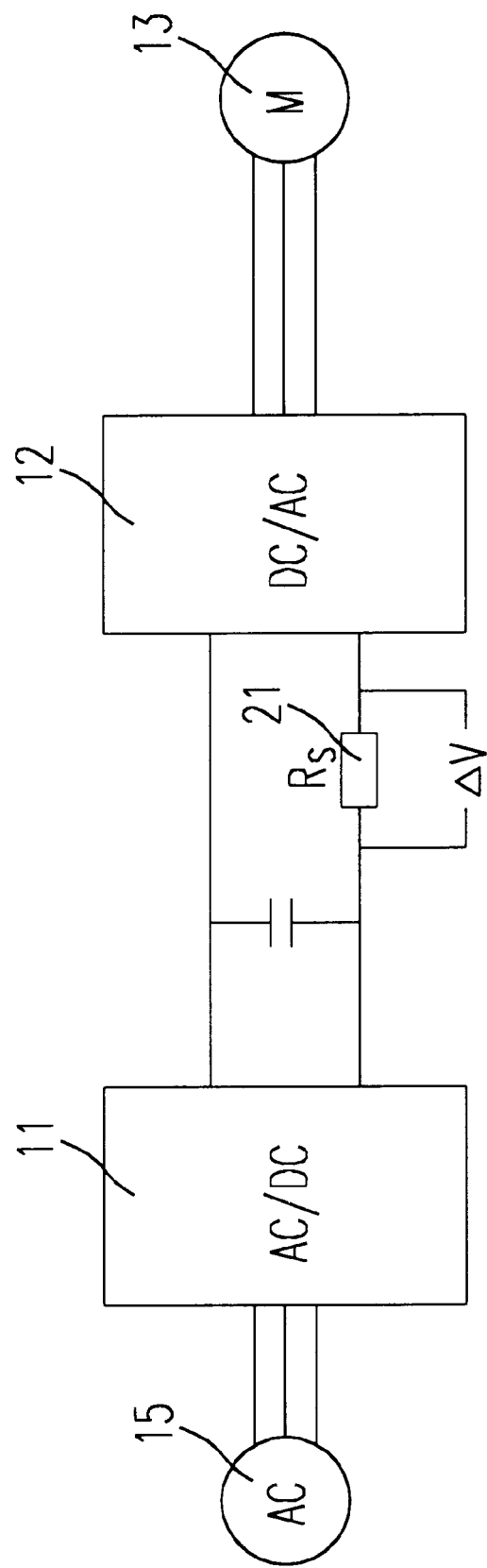
FIG. 2 is a diagram showing another conventional circuit of a frequency converter.
Figure 3:
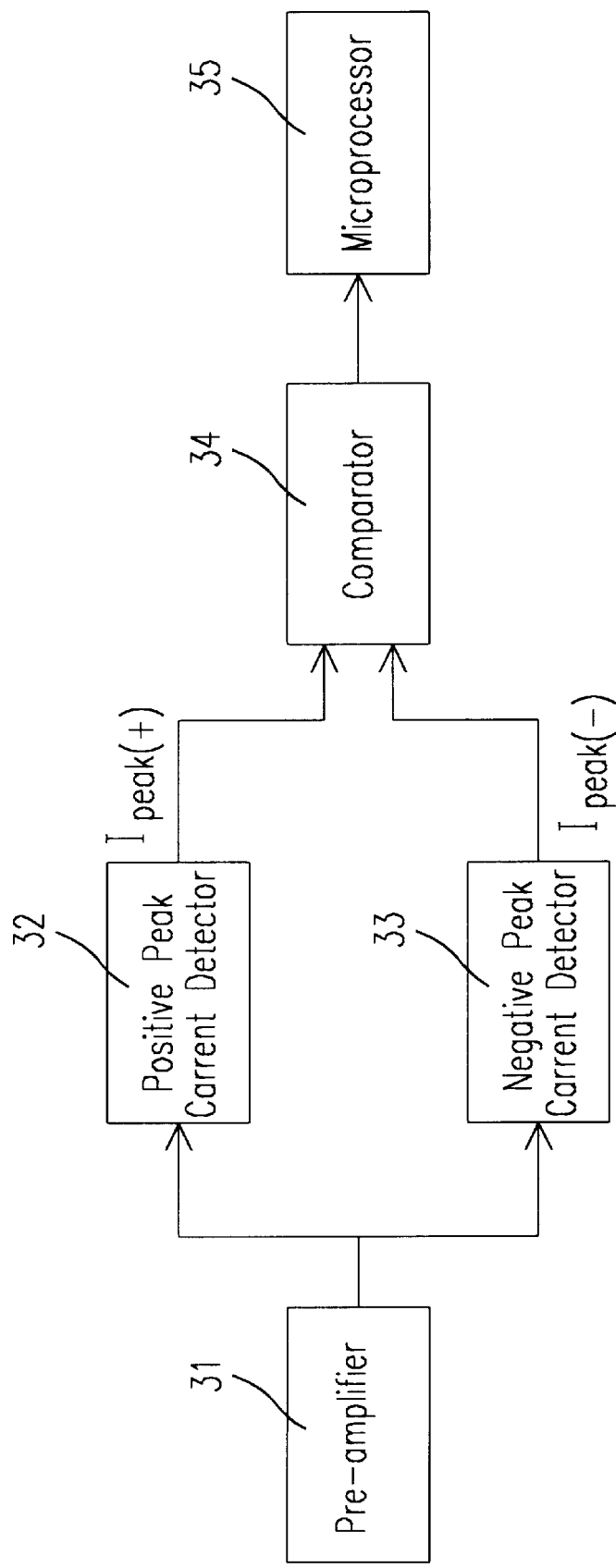
FIG. 3 is a diagram showing the devices used for a dead-time compensation of a prior art.
Figure 4:
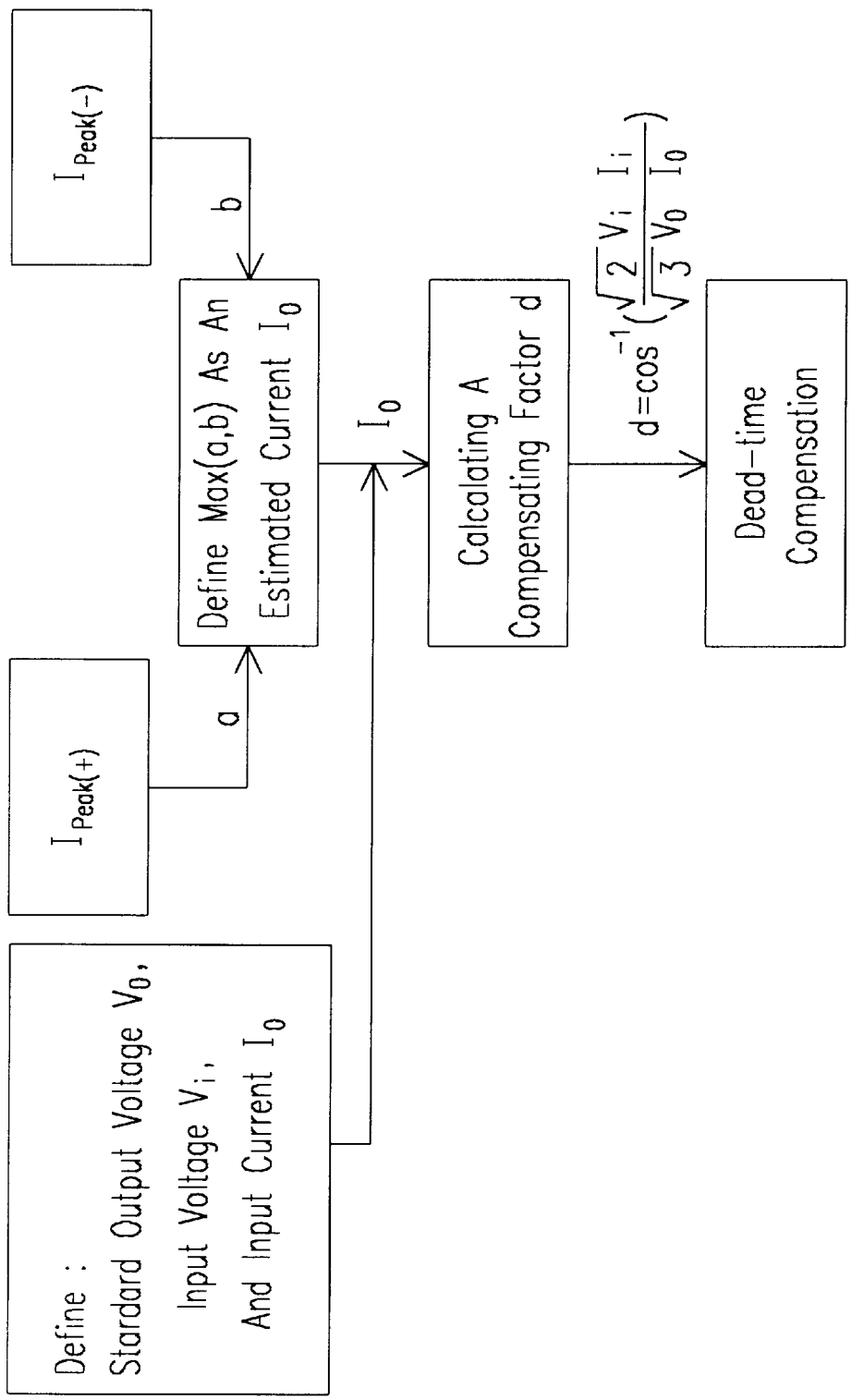
FIG. 4 is a flow chart illustrating the method for compensating a signal according to a prior art.
Figure 5A:
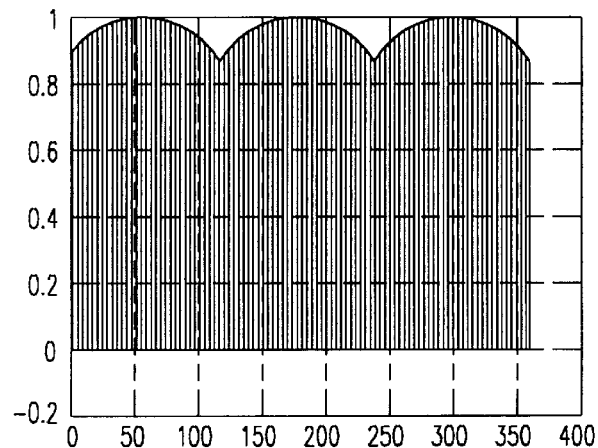
FIGS. 5(a)–5(c) are schematic diagrams showing the waveforms of the signals having different phase angles in the prior art.
Figure 5B:
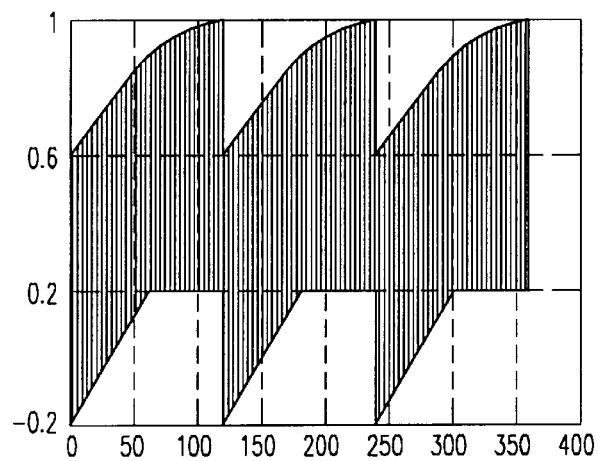
Figure 5C:
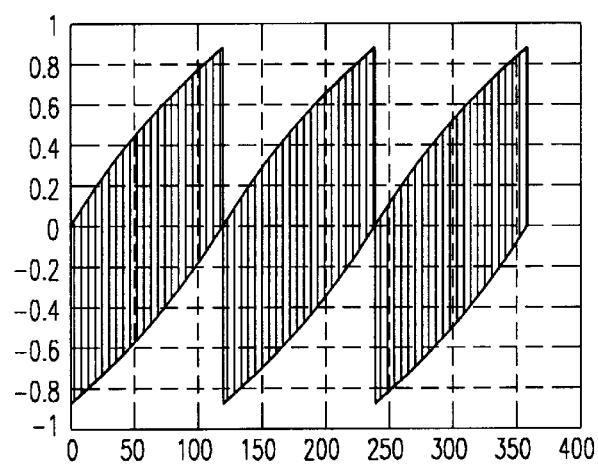
Figure 6:
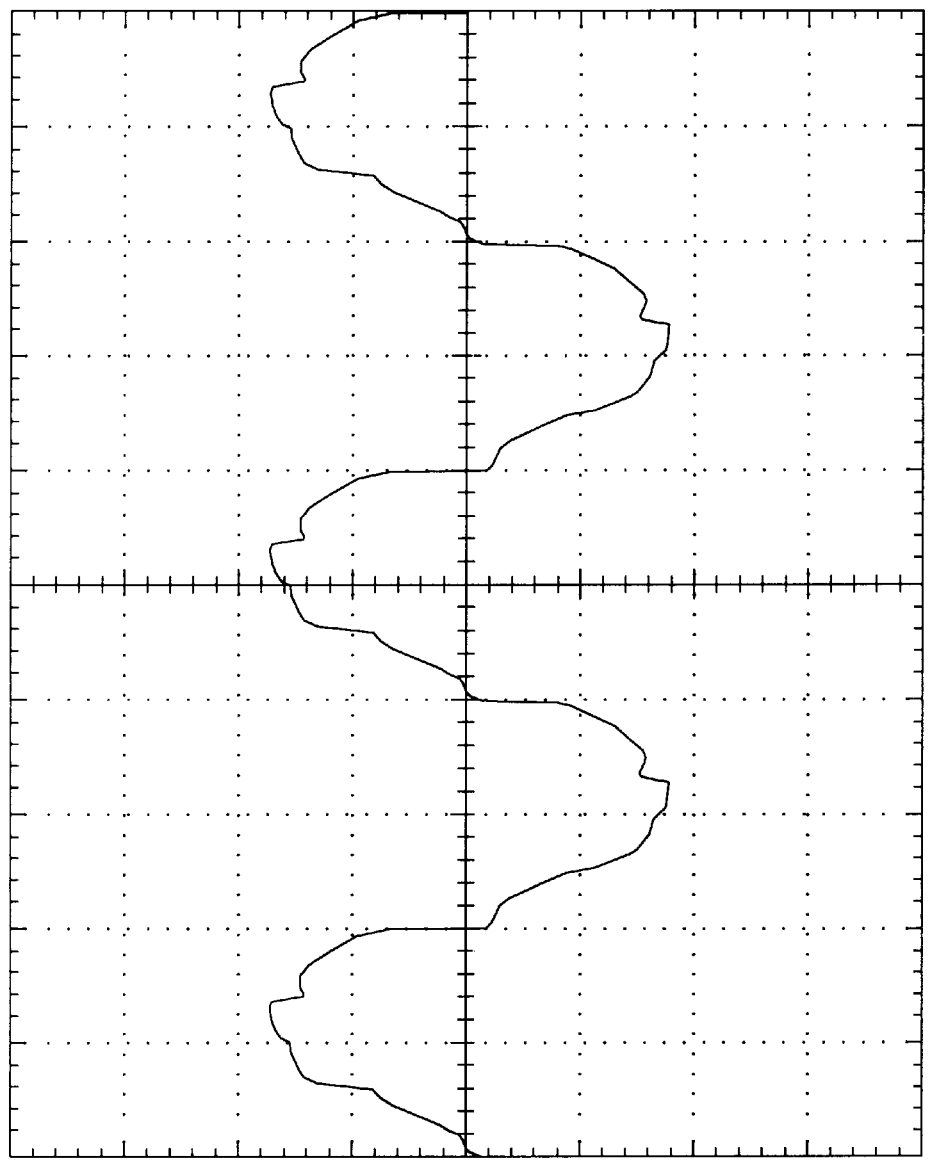
FIG. 6 is a schematic diagram showing the form of the current with poor compensation in the prior art.
Figure 7:
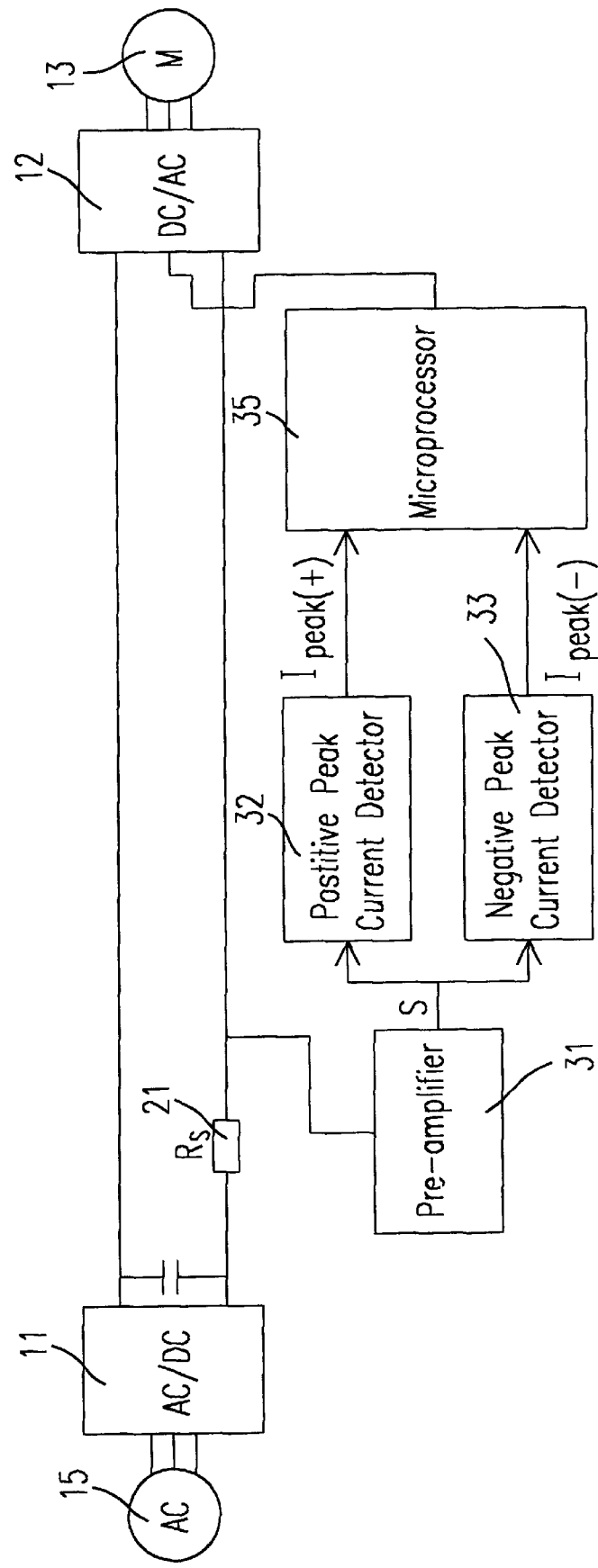
FIG. 7 is a schematic diagram showing the circuits used in the dead-time compensation according to the present invention.

Please refer to FIG. 7 which shows the feedback device for estimating a compensating factor used in the dead-time compensation according to the present invention. The feedback device includes a resistor 21, a preamplifier 31, a positive peak current detector 32, a negative peak current detector 33, and a microprocessor 35. The voltage difference of the resistor 21 is measured and then transformed to a current signal. The current signal is amplified by a preamplifier 31 and then divided into a positive peak signal and a negative peak signal. The currents $I_{peak}(+)$ and $I_{peak}(-)$ of the positive peak signal and the negative peak signal are respectively measured by the positive peak current detector 32 and the negative peak current detector 33. In the microprocessor 35, an estimated output current $I_o$ is estimated and then a compensating factor of the dead-time compensation is calculated.

Figure 8:
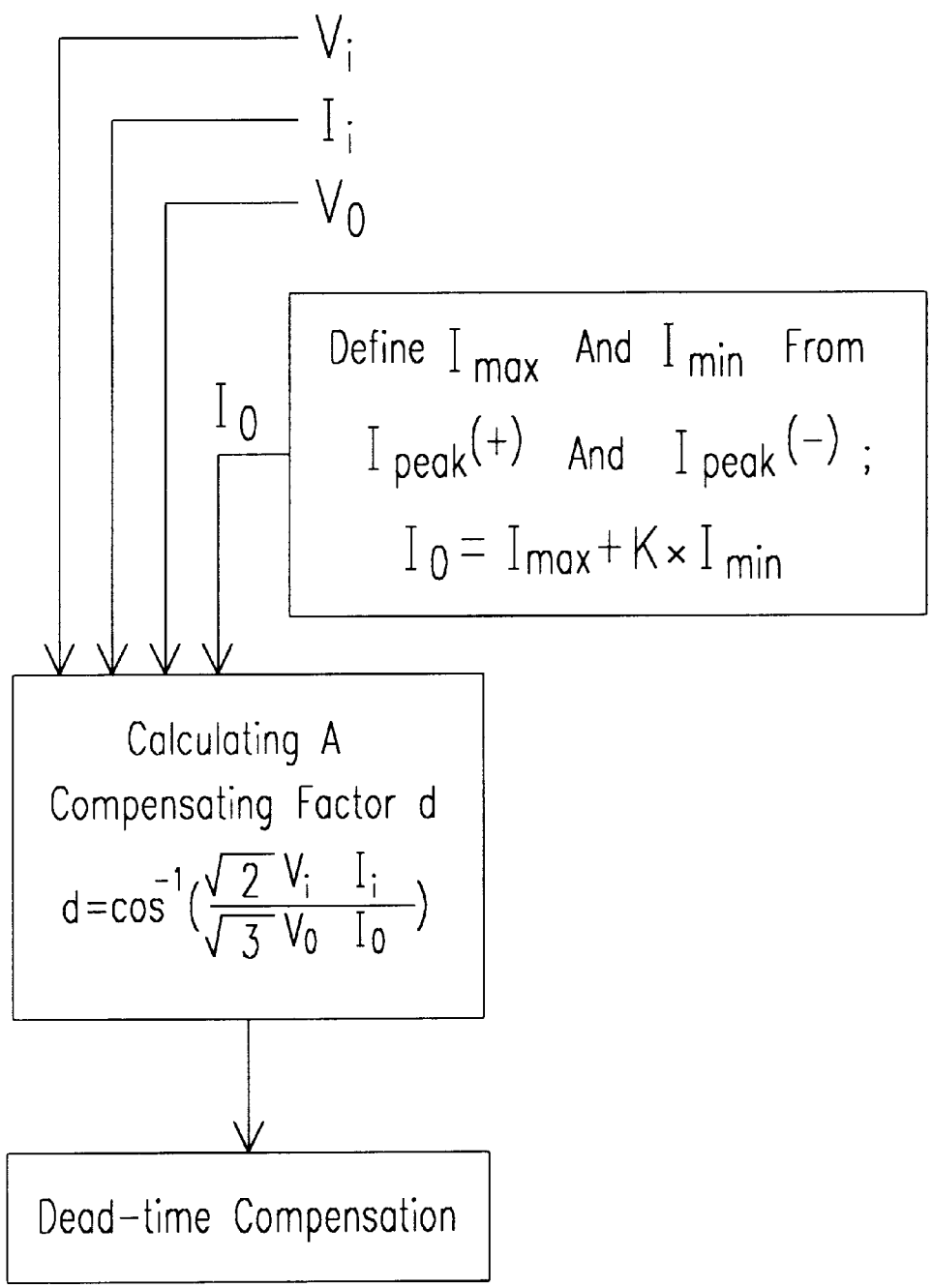
FIG. 8 is a flow chart showing the method for compensation a signal in the present invention.

Referring to FIG. 8 which is a flow chart showing the method for compensating the output signal of a DC/AC converter by the compensating factor according to the present invention. The output voltage $V_o$ outputted from the DC/AC converter is defined first. The input voltage $V_i$ and input current $I_i$ of the DC/AC converter are then measured. Then, the positive peak current $I_{peak}(+)$ and the negative peak current $I_{peak}(-)$ of the feedback device are measured. The relatively larger one of the $I_{peak}(+)$ and $I_{peak}(-)$ is defined as $I_{max}$ and the relatively smaller one of the $I_{peak}(+)$ and $I_{peak}(-)$ is defined as $I_{min}$. The estimated output current $I_o$ of the converter depends on both of $I_{max}$ and $I_{min}$. The estimated output current $I_o$ is estimated by a first equation of $I_o = I_{max} + kI_{min}$ where k is a constant. The compensating factor d for compensating the signal is then calculated by a second equation of $$d = \cos^{-1}\left(\frac{\sqrt{2}}{\sqrt{3}} \frac{V_i \cdot I_i}{V_o \cdot I_o}\right).$$

Finally, the output current of the DC/AC converter is compensated according to the compensating factor d.

In the prior art, the maximal peak current $I_{max}$ is directly defined as the estimated output signal $I_o$. Under such circumstance, the estimated output current $I_o$ should be the same as the actual output current. However, for the DC/AC converter having a phase angle of 90 degree, the peak current of the input signal is 0.886 times smaller than the actual output current. The estimated output current is smaller than the actual output current in this case. On the contrary, the estimated output current is the same with the actual output current by using the first equation according to the present invention. When the phase angle is 90 degree, the first equation becomes 0.866+0.866k=1. The k value can be calculated from the first equation; therefore, k is 0.1547. The k value is varied with the phase angle, but the difference is small. Therefore, k can be defined as a constant, that is, k is 0.1547.

Figure 9:
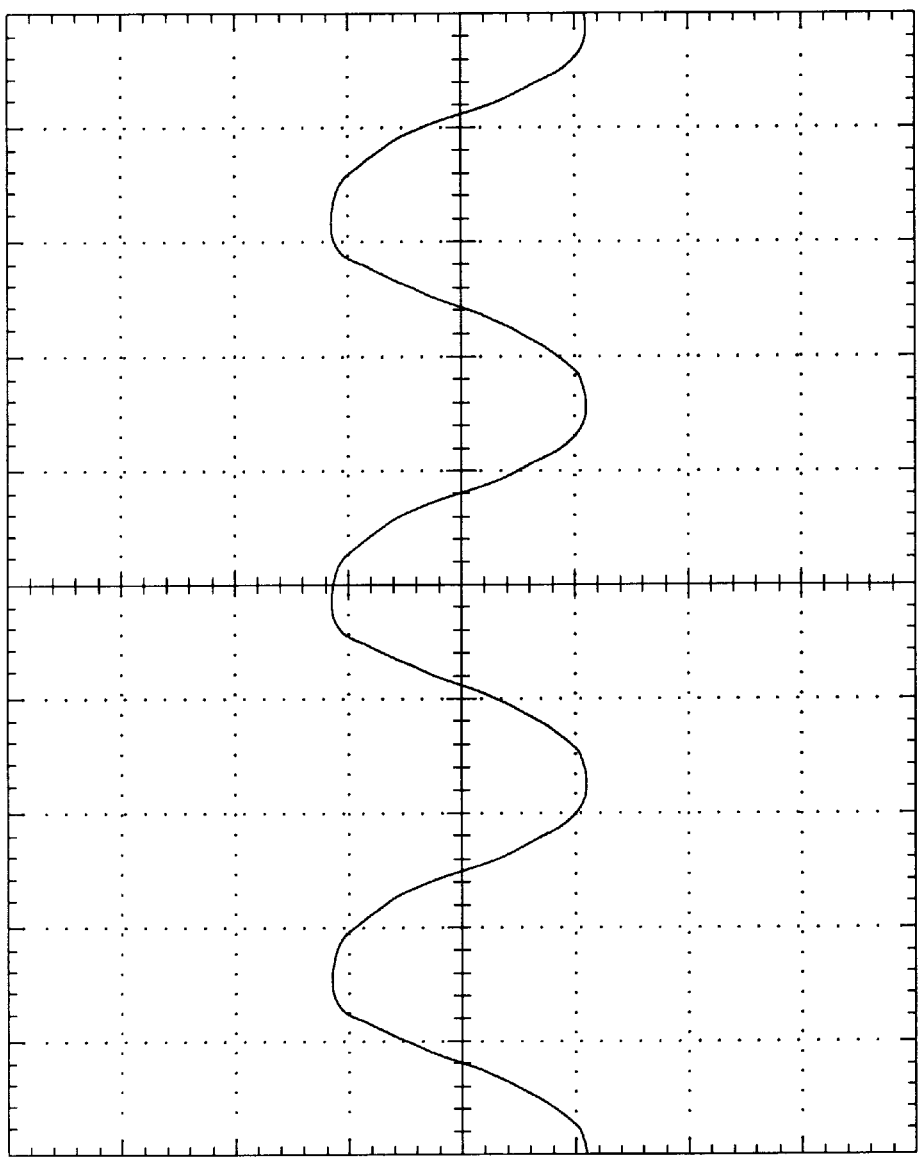
FIG. 9 is a schematic diagram showing the form of the current after compensation according to the present invention.

By the method described in the present invention, the estimated output currents will be approached to the actual output currents having different phase angles, especially when the phase angles are ranged from 60 to 90 degree. Because the estimated phase angle calculated by the second equation will be similar to the actual phase angle, the form of the signal after the compensation is very smooth as shown in FIG. 9.

Figure 10:
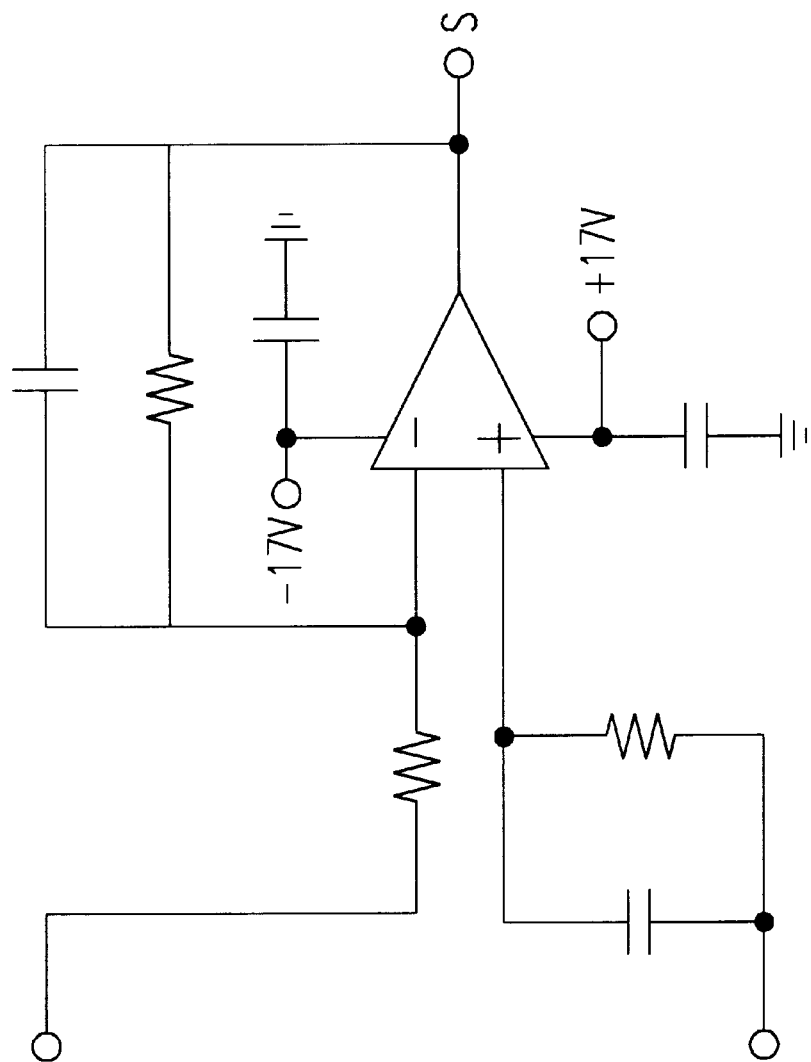
FIG. 10 is a schematic diagram showing the circuit of the preamplifier according to the present invention.
Figure 11:
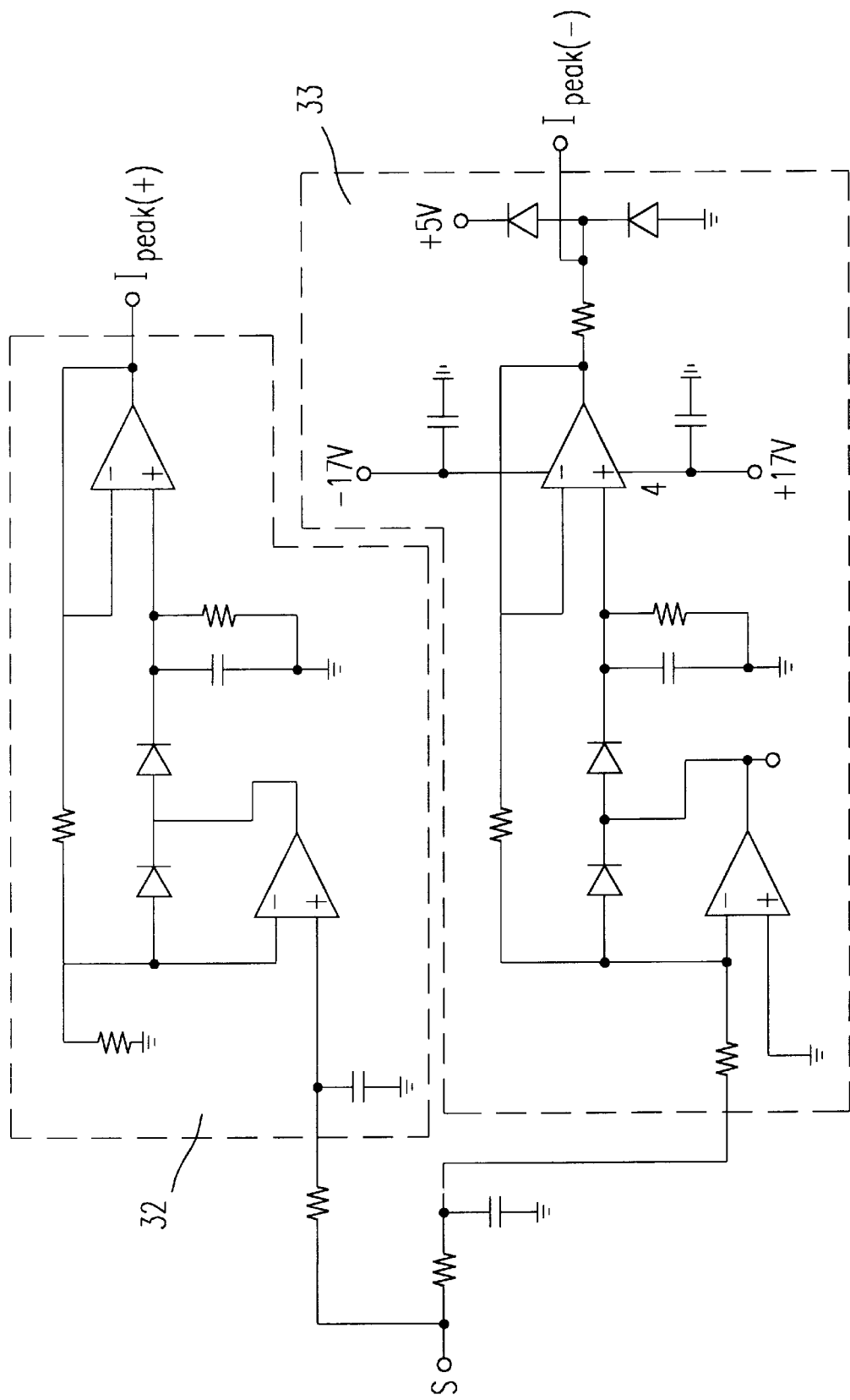
FIG. 11 is a diagram showing the circuits of the positive peak current detector and negative peak current detector according to the present invention.

Please refer to FIG. 10 which is a diagram showing the circuit of the preamplifier 31. In addition, FIG. 11 is a diagram showing the circuits of the positive peak current detector 32 and negative peak current detector 33 in the present invention. The circuits have various modifications and can be easily made by those skilled in the art, so there is no further description of these circuits.

In the present invention, the output current of the frequency converter can be estimated precisely. Two peak currents $I_{peak}(+)$ and $I_{peak}(-)$ of the input signal are measured. In the method for compensating a signal according to the present invention, the estimated output current is not calculated directly from the relatively lager one of the peak currents. The relatively larger one of the $I_{peak}(+)$ and $I_{peak}(-)$ is defined as $I_{max}$ and the relatively smaller one of the $I_{peak}(+)$ and $I_{peak}(-)$ is defined as $I_{min}$. The estimated output current $I_o$ is then calculated by an equation $I_o=I_{max}+kI_{min}$ where k is a constant. Therefore, the estimated output current is very similar to the actual output current. The compensating factor d for compensating the output signal of the converter is then calculated from the standard output voltage $V_o$, the input voltage $V_i$, the input current $I_i$, and the estimated output current $I_o$ by a second equation $$d = \cos^{-1}\left(\frac{\sqrt{2}}{\sqrt{3}} \frac{V_i \cdot I_i}{V_o \cdot I_o}\right).$$

Therefore, the output signal after compensated by the compensating factor is very similar to the actual output signal.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for compensating an output signal of an electronic device, wherein said electronic device includes an input end electrically connected to a feedback device and an output end electrically connected to a load, comprising steps of:

(a) defining an output voltage $V_o$ of said load;

(b) determining an input voltage $V_i$ and an input current $I_i$ of said electronic device;

(c) generating a feedback signal based on said input voltage $V_i$;

(d) determining a maximum current $I_{max}$ and a minimum current $I_{min}$ of said feedback signal passing through said feedback device;

(e) defining an estimated output signal $I_o$ of said electronic device based on said maximum current $I_{max}$ and said minimum current $I_{min}$; and (f) compensating said output signal of said electronic device according to a compensating factor d determined by a second equation $$d = \cos^{-1}\left[\frac{\sqrt{2V_i} \cdot I_i}{\sqrt{3V_o} \cdot I_o}\right],$$

where $V_o$ is said output voltage, $V_i$ is said input voltage, $I_i$ is said input current, and $I_o$ is said estimated output signal of said electronic device.

2. The method according to claim 1 wherein said electronic device is a DC/AC converter coupled to an AC/DC converter.

3. The method according to claim 2 wherein said feedback device comprises a resistor electrically connected between said AC/DC converter and said DC/AC converter for generating a voltage difference in order to estimate a current of said feedback signal.

4. The method according to claim 3 wherein said feedback signal is amplified by an amplifier of said feedback device and then divided into a positive peak signal and a negative peak signal.

5. The method according to claim 4 wherein currents of said positive peak signal and said positive peak signal are respectively detected by a positive peak current detector and a negative peak current detector.

6. The method according to claim 5 wherein said maximum current $I_{max}$ is the relatively larger one detected by said positive peak current detector and said negative peak current detector.

7. The method according to claim 6 wherein said minimum current $I_{min}$ is the relatively smaller one detected by said positive peak current detector and said negative peak current detector.

8. The method according to claim 1 wherein said estimated output current $I_o$ is calculated according to said maximum current $I_{max}$ and said minimum current $I_{min}$ by a first equation of $I_o=I_{max}+kI_{min}$ where k is a constant.

9. The method according to claim 1 wherein said method is applied in compensating a signal of a frequency converter.

10. The method according to claim 1 wherein said method is a dead-time compensation.

11. A method for determining a compensating factor d for compensating an output signal of a converter, wherein said converter has an input end electrically connected to a feedback device and an output end electrically connected to a load, comprising the steps of:

(a) defining an output voltage $V_o$ of said load;

(b) determining an input voltage $V_i$ and an input current $I_i$ of said electronic device;

(c) generating a feedback signal based on said input voltage $V_i$;

(d) determining a maximum current $I_{max}$ and a minimum current $I_{min}$ of said feedback signal passing through said feedback device;

(e) defining an estimated output signal $I_o$ of said converter based on said maximum current $I_{max}$ and said minimum current $I_{min}$; and (f) calculating said compensating factor d by a second equation $$d = \cos^{-1}\left[\frac{\sqrt{2V_i} \cdot I_i}{\sqrt{3V_o} \cdot I_o}\right],$$

where $V_o$ is said output voltage, $V_i$ is said input voltage, $I_i$ is said input current, and $I_o$ is said estimated output current.

12. The method according to claim 11 wherein said estimated output current $I_o$ of said converter is calculated according to said maximum current $I_{max}$ and said minimum current $I_{min}$ by a first equation of $I_o=I_{max}+kI_{min}$ where k is a constant.

* * * * *